United States Patent
Ma et al.

(10) Patent No.: US 8,353,199 B1
(45) Date of Patent: Jan. 15, 2013

(54) MULTI-DEGREE-OF-FREEDOM TEST STAND FOR UNMANNED AIR VEHICLES

(75) Inventors: Ou Ma, Las Cruces, NM (US); Carlos E. Ortega, Las Cruces, NM (US); Ken Ruble, Chaparral, NM (US); Qi Lu, Pudong (CN)

(73) Assignee: Arrowhead Center, Inc., Las Cruces, NM (US)

( * ) Notice: Subject to any disclaimer, the term of this patent is extended or adjusted under 35 U.S.C. 154(b) by 183 days.

(21) Appl. No.: 12/762,981

(22) Filed: Apr. 19, 2010

Related U.S. Application Data

(60) Provisional application No. 61/170,445, filed on Apr. 17, 2009.

(51) Int. Cl.
- *B64C 17/00* (2006.01)
- *A63H 27/00* (2006.01)
- *A47B 9/02* (2006.01)
- *F16M 11/00* (2006.01)

(52) U.S. Cl. .............. 73/65.05; 248/163.1; 108/136; 446/232

(58) Field of Classification Search ............ 73/65.05; 434/33; 182/2.7; 248/163.1; 108/136; 446/232
See application file for complete search history.

(56) References Cited

U.S. PATENT DOCUMENTS

| | | | |
|---|---|---|---|
| 2,674,500 A | 4/1954 | Hukari | |
| 3,131,486 A | 5/1964 | Derschmidt | |
| 3,225,458 A | 12/1965 | Glockl | |
| 3,246,403 A | 4/1966 | Vaughen | |
| 3,419,238 A | 12/1968 | Flory | |
| 3,548,518 A * | 12/1970 | McRae | 434/32 |
| 3,948,467 A | 4/1976 | Krusius | |
| 4,120,099 A | 10/1978 | Fett | |
| 4,601,663 A | 7/1986 | Allison et al. | |
| 4,666,362 A * | 5/1987 | Landsberger et al. | 414/735 |
| 4,883,249 A | 11/1989 | Garland | |
| 4,886,397 A | 12/1989 | Cherbonnier | |
| 4,917,610 A * | 4/1990 | Whiteman | 434/33 |
| 5,397,323 A * | 3/1995 | Taylor et al. | 606/130 |
| 6,539,333 B1 | 3/2003 | Metelski | |

(Continued)

FOREIGN PATENT DOCUMENTS

DE 2051104 4/1972

(Continued)

OTHER PUBLICATIONS

Lu, Qi et al., "A Gravity Balanced Test Stand for Flight Testing of Small/Micro Unmanned Aerial Vehicles", *Proceedings of IMECE2008* 2008 ASME International Mechanical Engineering Congress and Exposition, Oct. 31-Nov. 6, 2008, Boston, Massachusetts Oct. 31, 2008 , 1-7.

*Primary Examiner* — Lisa Caputo
*Assistant Examiner* — Jonathan Dunlap
(74) *Attorney, Agent, or Firm* — Samantha A. Updegraff; Deborah A. Peacock; Peacock Myers, P.C.

(57) ABSTRACT

The invention is a multiple degree-of-freedom test stand for unmanned air vehicles, and is particularly useful for small or micro unmanned air vehicles. The stand is gravity balanced using springs such that no weight of any part of the stand becomes a burden to the tested vehicle when it flies while constrained to the stand. A joint and a plurality of members are used to enable multiple degrees of freedom.

24 Claims, 18 Drawing Sheets

U.S. PATENT DOCUMENTS

| | | | |
|---|---|---|---|
| 7,367,772 B2 | 5/2008 | Khajepour et al. | |
| 7,370,842 B2* | 5/2008 | Fritz | 248/564 |
| 7,601,104 B2* | 10/2009 | Agrawal et al. | 482/69 |
| 7,874,223 B2* | 1/2011 | Sugar et al. | 74/110 |
| 8,152,699 B1* | 4/2012 | Ma et al. | 482/69 |
| 8,188,843 B2* | 5/2012 | Helmer et al. | 340/407.1 |
| 2006/0213305 A1* | 9/2006 | Sugar et al. | 74/490.01 |
| 2006/0241539 A1* | 10/2006 | Agrawal et al. | 602/23 |
| 2006/0260621 A1* | 11/2006 | Agrawal et al. | 128/845 |
| 2007/0080275 A1* | 4/2007 | Stachowski et al. | 248/323 |
| 2009/0215588 A1* | 8/2009 | Riener et al. | 482/7 |
| 2010/0019890 A1* | 1/2010 | Helmer et al. | 340/407.1 |

FOREIGN PATENT DOCUMENTS

| | | |
|---|---|---|
| EP | 0 437 741 A2 | 7/1991 |
| SU | 1759731 | 9/1992 |

* cited by examiner

MULTI-DEGREE-OF-FREEDOM TEST STAND FOR UNMANNED AIR VEHICLES

CROSS-REFERENCE TO RELATED APPLICATIONS

This application claims priority to and the benefit of the filing of U.S. Provisional Patent Application Ser. No. 61/170,445, entitled "Multi-Degree of Freedom Test Stand for Unmanned Air Vehicles", filed on Apr. 17, 2009, and the specification thereof is incorporated herein by reference.

STATEMENT REGARDING FEDERALLY SPONSORED RESEARCH OR DEVELOPMENT

The U.S. Government has sponsored in-part research for this invention, which gives the government certain rights to the invention as provided for by the terms of Contract No. FA9200-06-D-0020 awarded by the U.S. Air Force.

BACKGROUND OF THE INVENTION

1. Field of the Invention (Technical Field)

The present invention relates to a test stand for unmanned air vehicles (UAVs) and/or micro air vehicles (MAVs) and more particularly to a multi-degree-of-freedom (DOF) gravity balanced UAV and/or MAV test stand.

2. Description of Related Art

It is a tremendous challenge to test autonomous flight capability of an UAV or MAV such as an autonomous helicopter. This is because the flying vehicle can crash or fly out of control when the flight control system does not perform properly. Such a situation can easily happen during an early test phase of the vehicle. To deal with this problem, a ground-fixed test stand is usually used to constrain the tested vehicle, so that it will not crash even if something goes wrong during a test.

However, a ground-fixed test stand has the drawback of adding extra load to the test vehicle, which is inconsistent with a real flight case. For small-scale UAVs, such as MAVs, this extra load may be too large to cope with. Therefore, active or powered test stands are sometimes used. Undoubtedly, active test stands are complicated in both design and operation. They are also subject to reliability problems. To continuously take advantage of the reliability and easy operation of passive test stands and also remove the burden of extra loading due to the weight of the moving part of the test stand, embodiments of the present invention comprise an innovative gravity-force balanced test stand.

Gravity balancing of a mechanical system or mechanism refers to the condition where no joint forces are required to keep the system or mechanism in equilibrium for all the configurations in its workspace. Basically, two approaches, namely, using counterweight or using springs, are available to achieve passive gravity balancing. However, using counterweight adds additional weight to the system resulting in larger moments and products of inertia of the system. Alternatively, gravity balancing with springs requires that the total potential energy (including both the gravitational energy and the elastic energy) of the mechanism remains constant. This approach keeps the mechanism balanced with a much smaller total mass. Some gravity balanced mechanisms using springs have been designed to serve as rehabilitation devices that compensate the gravity of patients' arms or legs.

Embodiments of the present invention comprise a multi-DOF passive UAV test stand that preferably employs springs to achieve gravity balancing at each configuration within the workspace. All of the weight of the entire moving part of the test stand is self balanced, such that no static load is exerted on the tested vehicle, allowing the UAV to be tested under a condition that is very similar to the free flight case.

BRIEF SUMMARY OF THE INVENTION

Embodiments of the present invention comprise an apparatus and method comprising a gravity balanced stand for testing an unmanned air vehicle (UAV). One embodiment of the gravity balanced stand preferably comprises an arm comprising at least two members, the members providing at least three degrees of freedom to the UAV, a joint disposed on the arm, the joint providing at least three degrees of freedom to the UAV, and at least one spring attached to the arm, wherein the spring achieves gravity balancing.

An embodiment of the present invention preferably comprises a stick disposed on an outer end of said arm, wherein said joint is disposed on said stick of said arm. This embodiment also optionally comprises a platform disposed between the stick and the joint and a damper disposed on a bottom portion of the stick for reducing impact on the UAV during landing. The spring preferably comprises a linear spring.

In one embodiment of the present invention, the test stand includes an adjustment mechanism for adjusting an attachment location of the spring. The adjustment mechanism preferably comprises a sliding apparatus. One of the embodiments of the present invention comprises a test stand having at least two springs attached to the arm.

In another embodiment of the present invention, the members comprise parallelograms, the stick comprises a substantially vertical stick, and the joint comprises a ball joint. The members preferably provide three translational degrees of freedom to the tested vehicle. The joint preferably provides three rotational degrees of freedom to the vehicle under test. The spring preferably comprises a balancing spring.

In yet another embodiment of the present invention, the members can comprise four member portions, wherein each portion forms a side of the member. Two of member portions can comprise substantially vertical member portions. A spring can be disposed between said substantially vertical member portions. One of the substantially vertical member portions is preferably located between and forms an end of both members. One of the substantially vertical member portions preferably comprises a connector for connecting to the joint. Ball bearings are preferably used for connecting the member portions together.

Another embodiment of the present invention comprises a method for testing an unmanned aerial vehicle (UAV). This method preferably comprises providing a stand comprising an arm having at least two members, the arm providing at least three degrees of freedom to the UAV, disposing a joint on the arm of the stand, the joint providing at least three degrees of freedom to the UVA, attaching the UAV to the joint, and testing the UAV. The method preferably includes gravity balancing the stand via at least one spring and reducing impact on the UAV during landing by providing a dampener. This method also preferably comprise flying the UAV and landing the UAV.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL
VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings.

Figure 5:
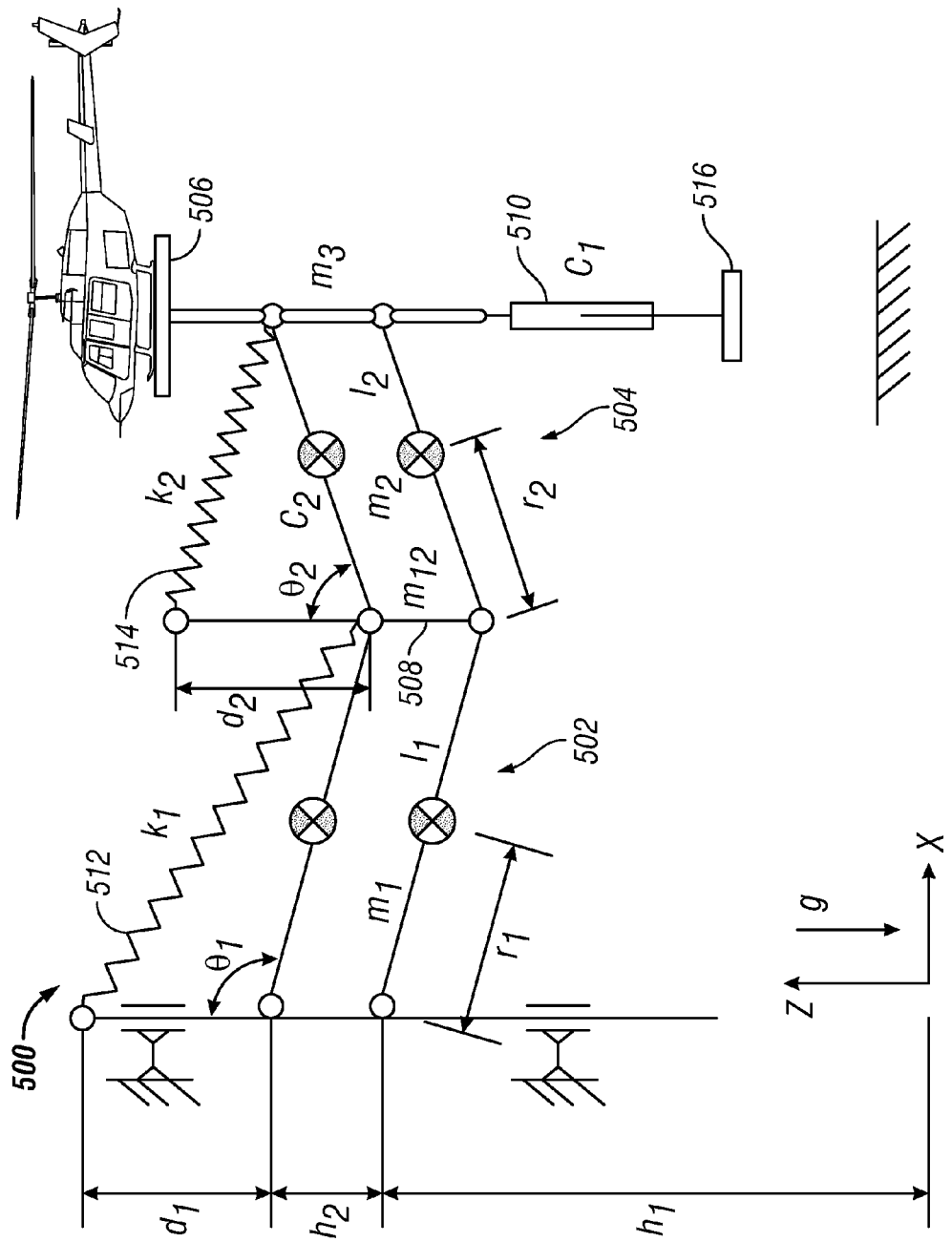
Figure 6:
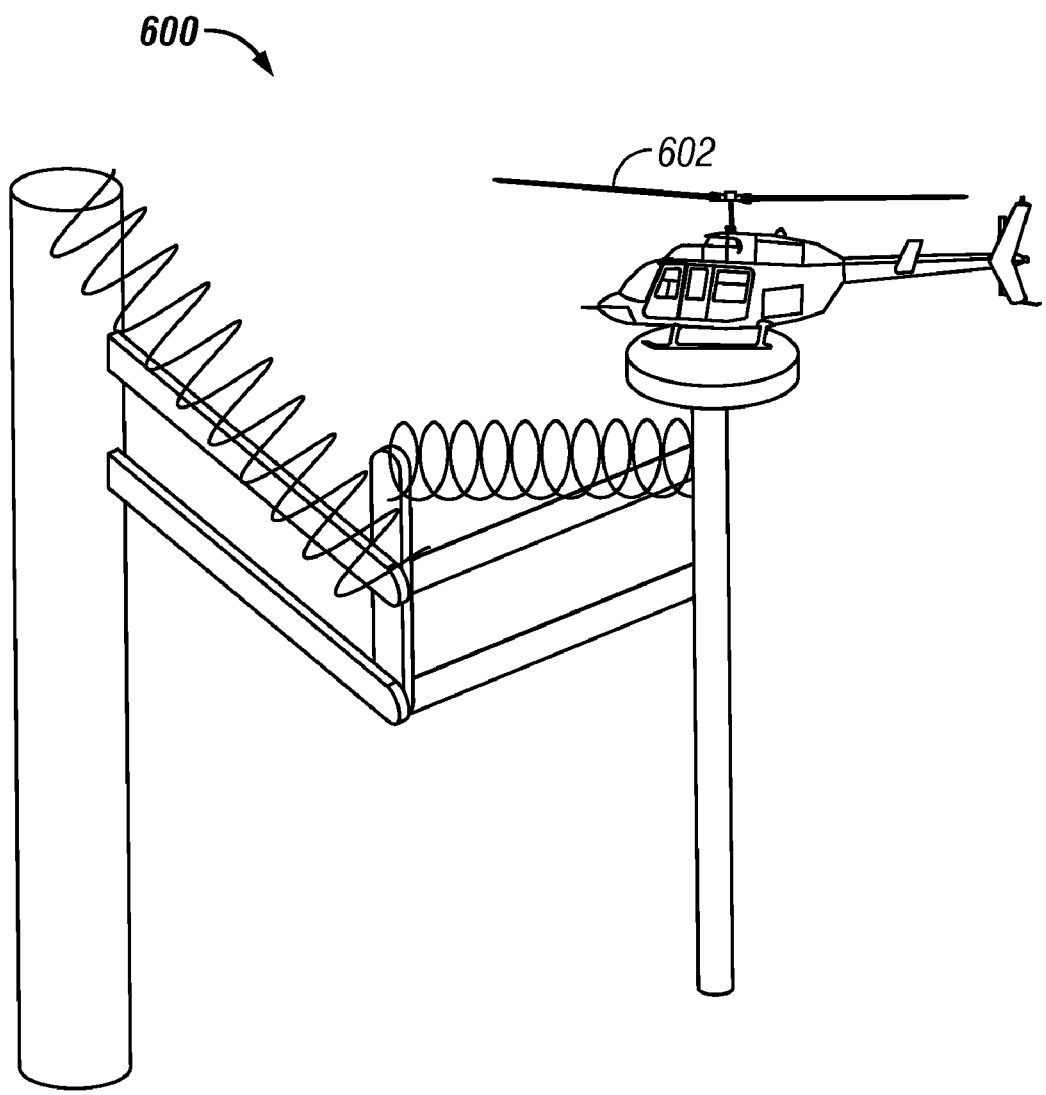
Figure 7:
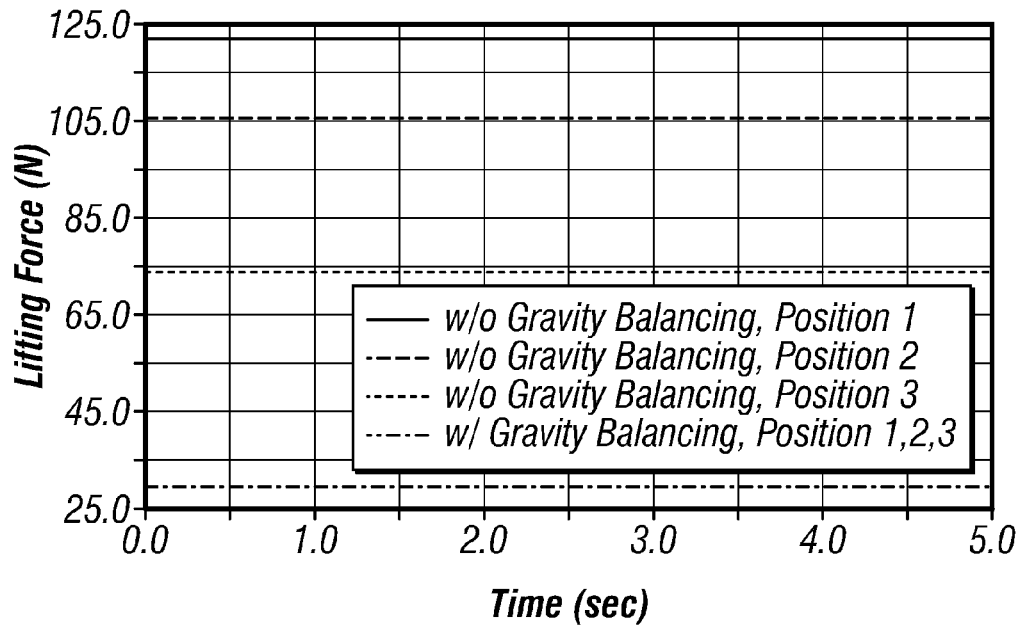
Figure 8:
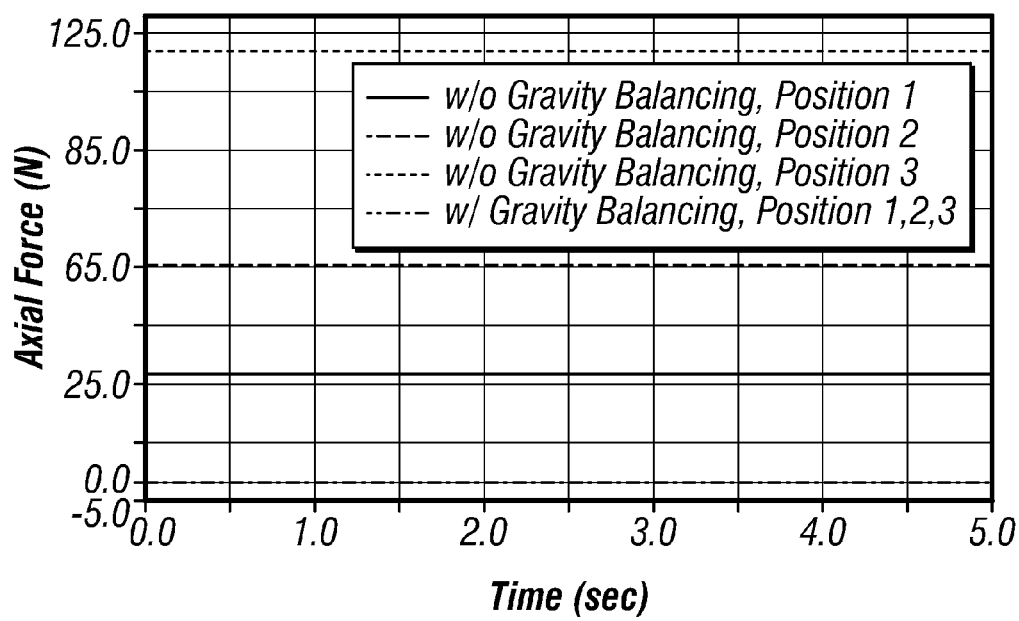
Figure 9:
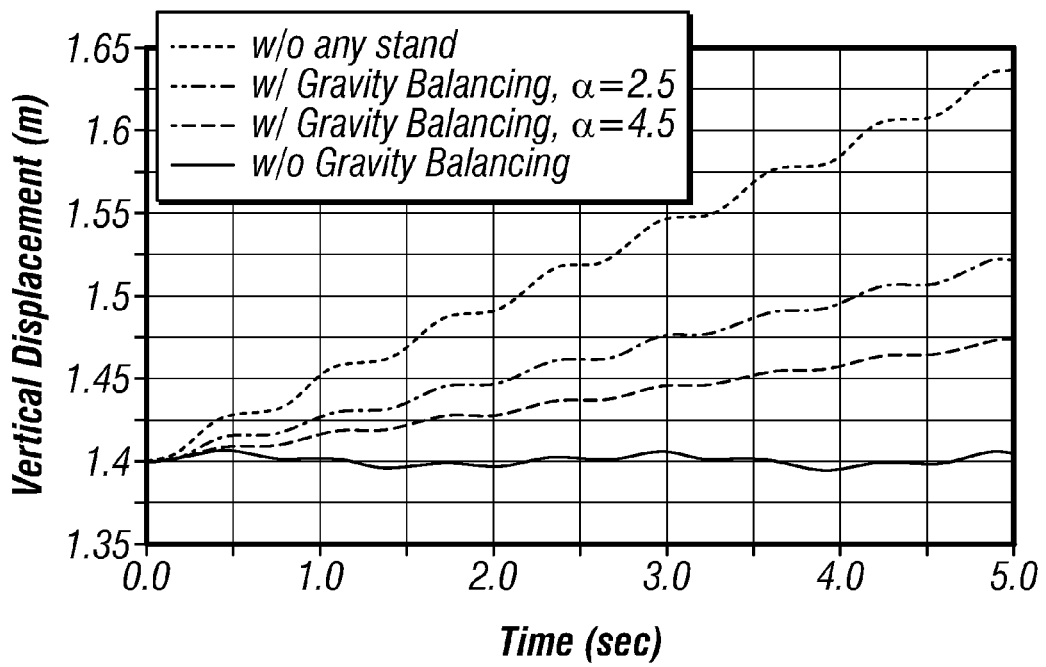
Figure 10:
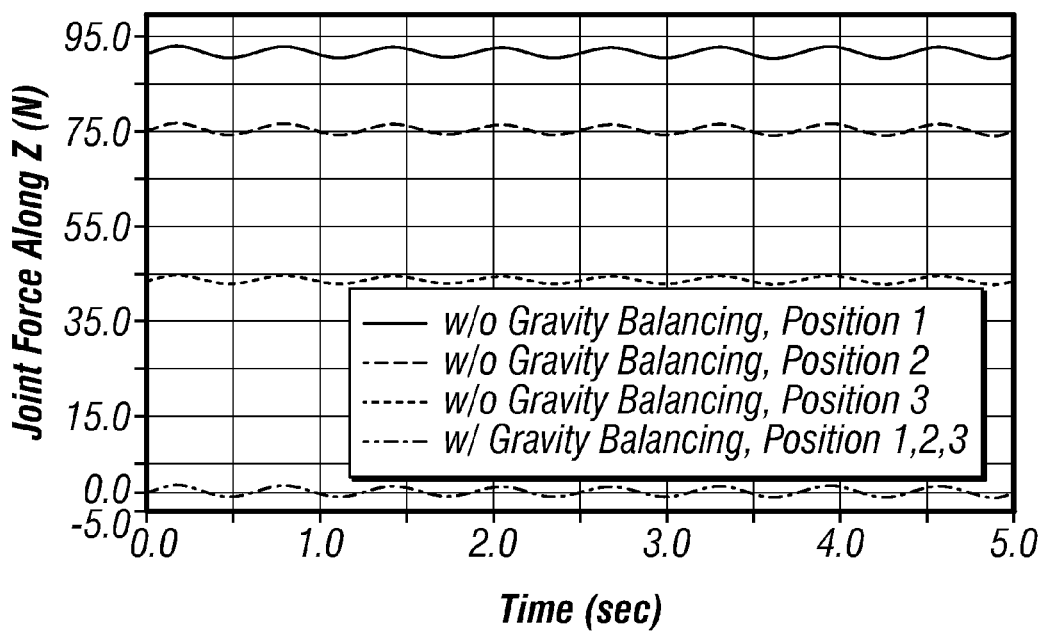
Figure 11:
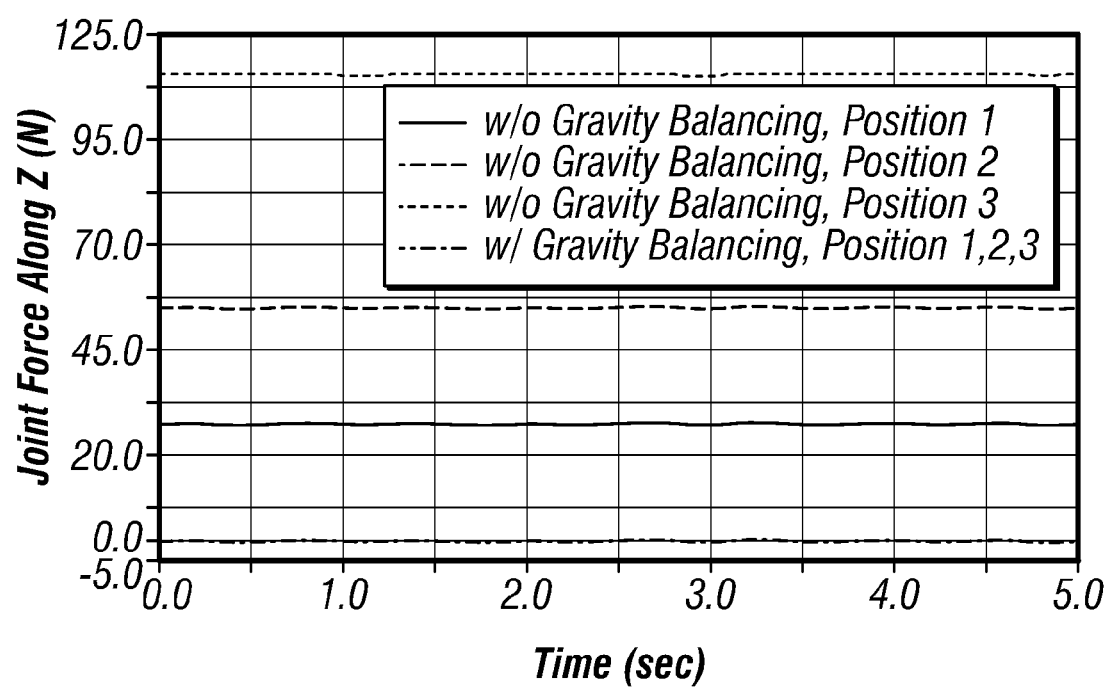
Figure 12:
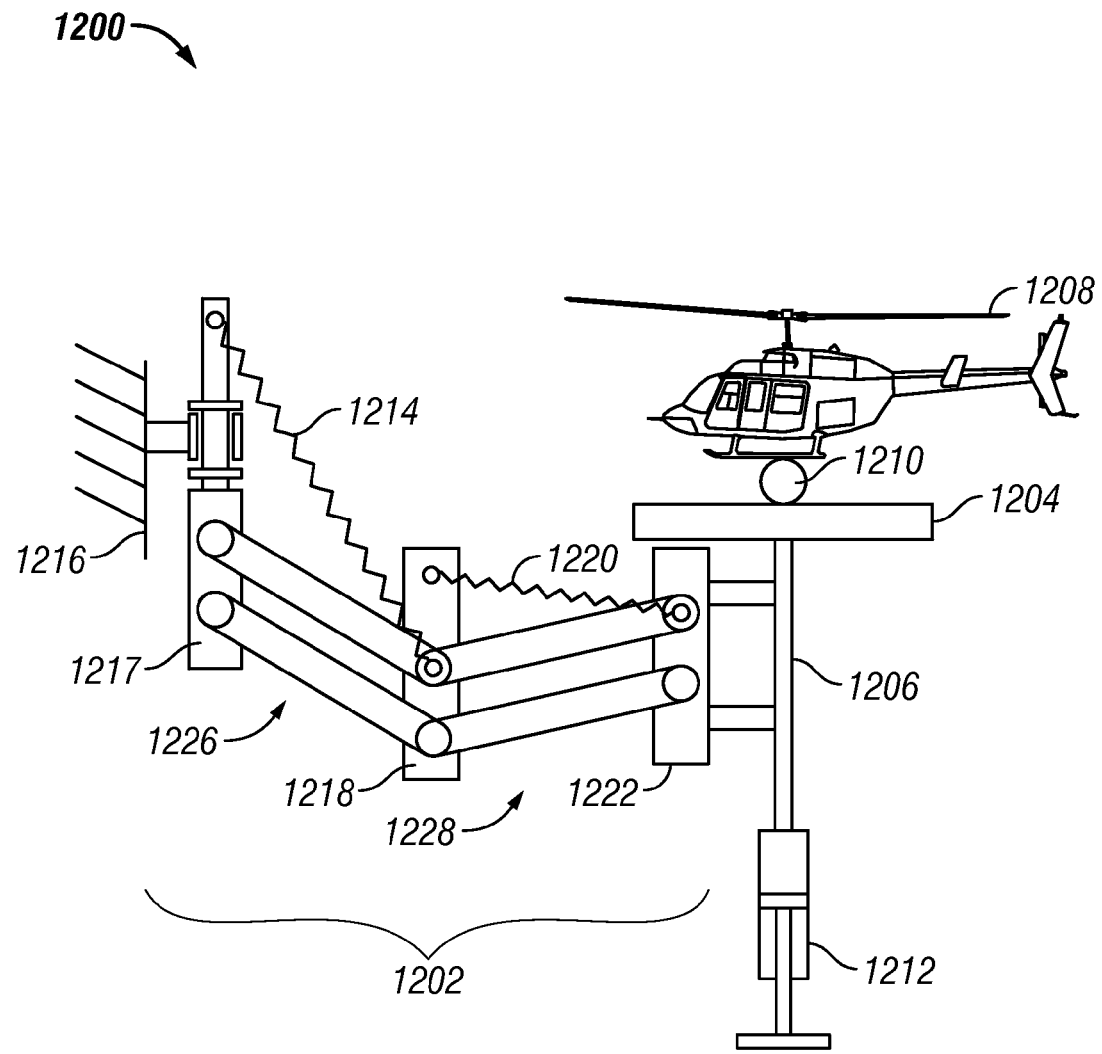
Figure 13A:
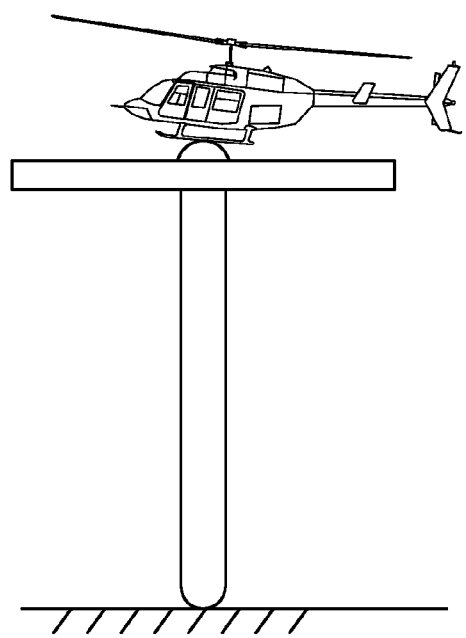
Figure 13B:
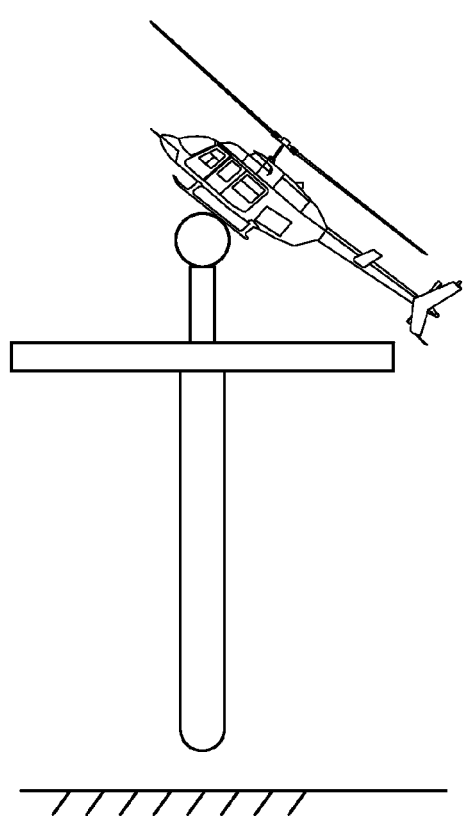
Figure 14:
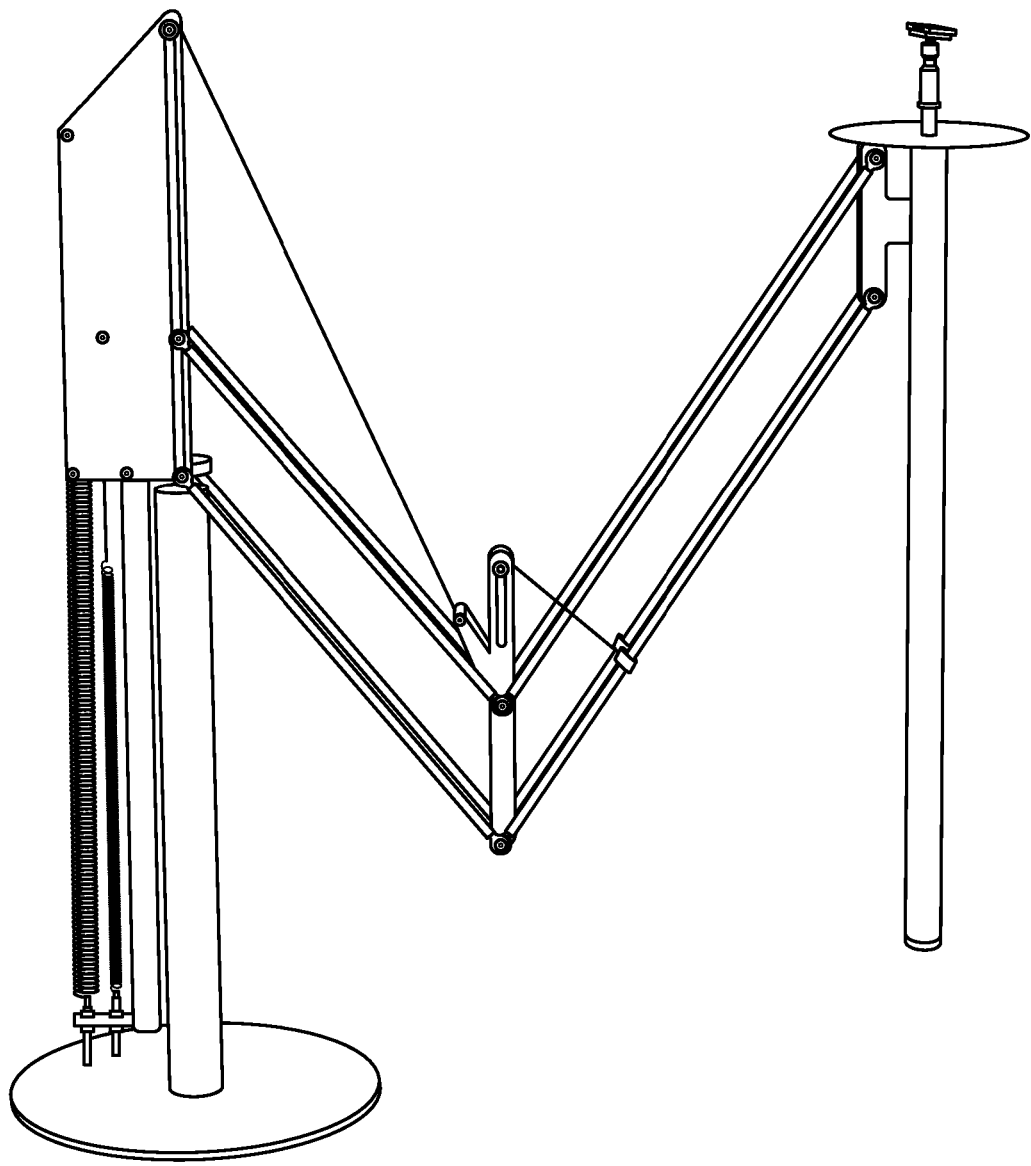
Figure 15A:
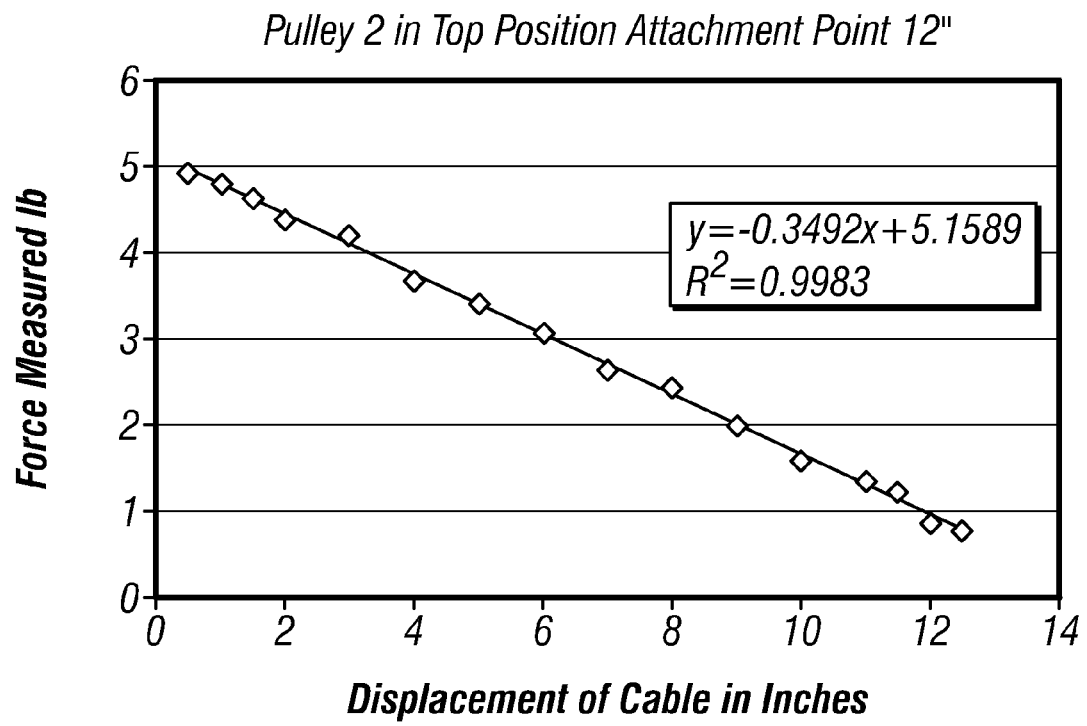
Figure 15B:
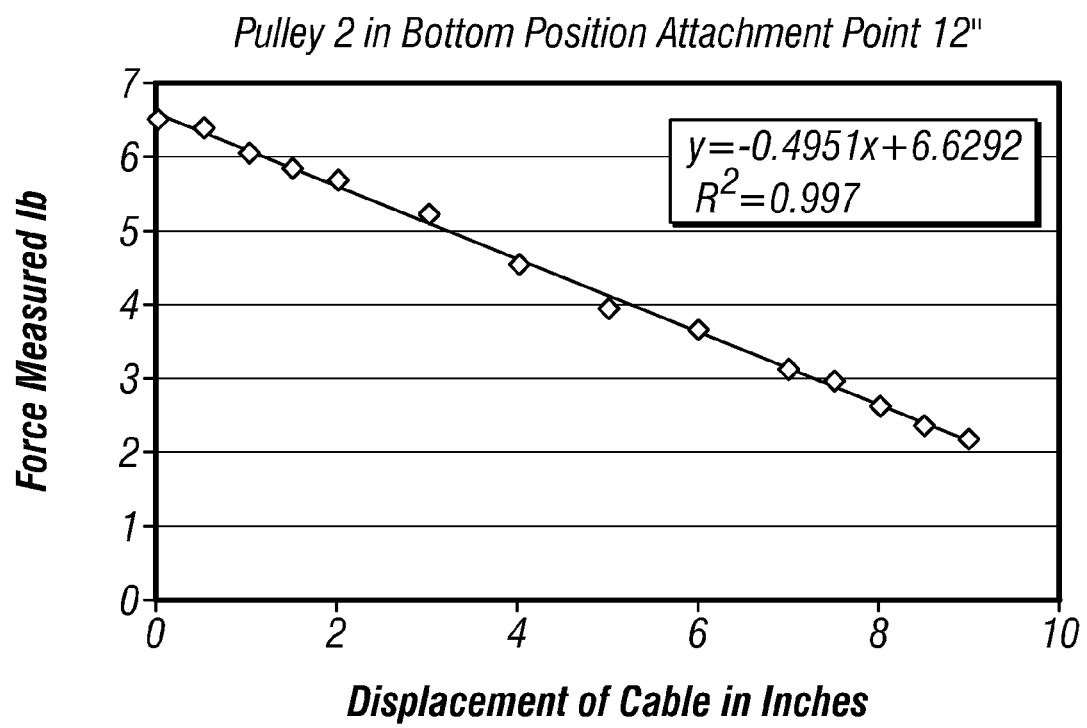
Figure 16A:
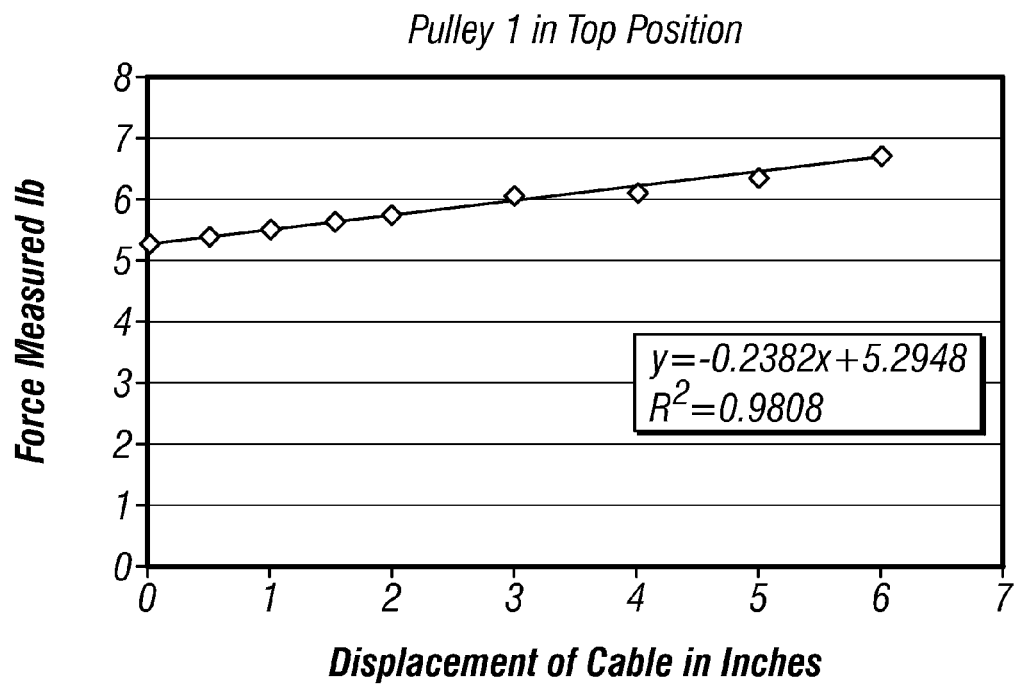
Figure 16B:
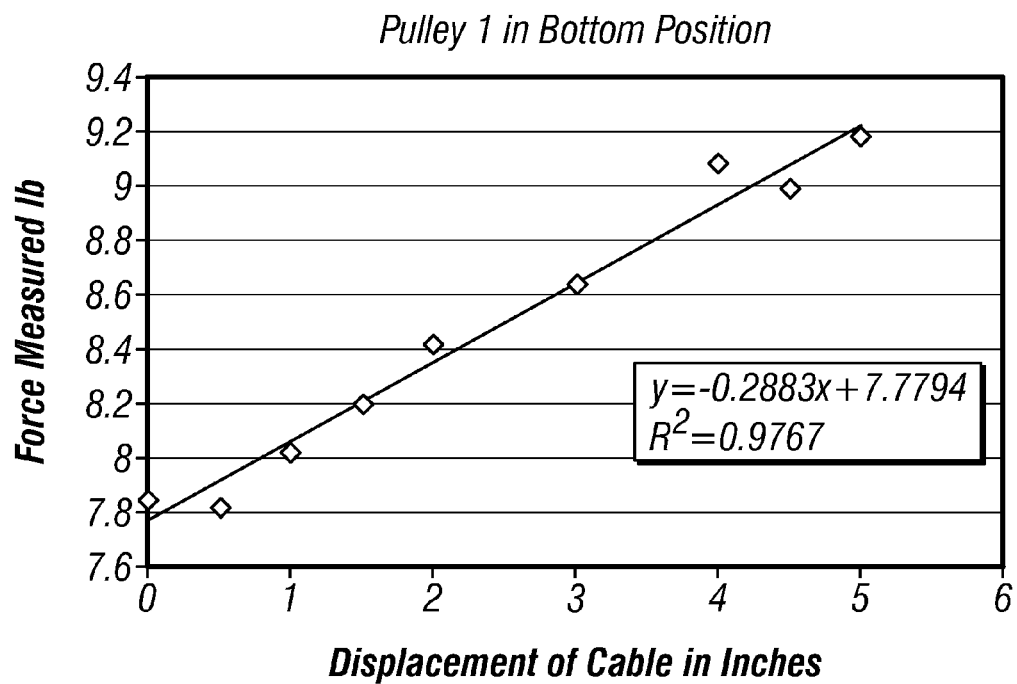
Figure 17A:
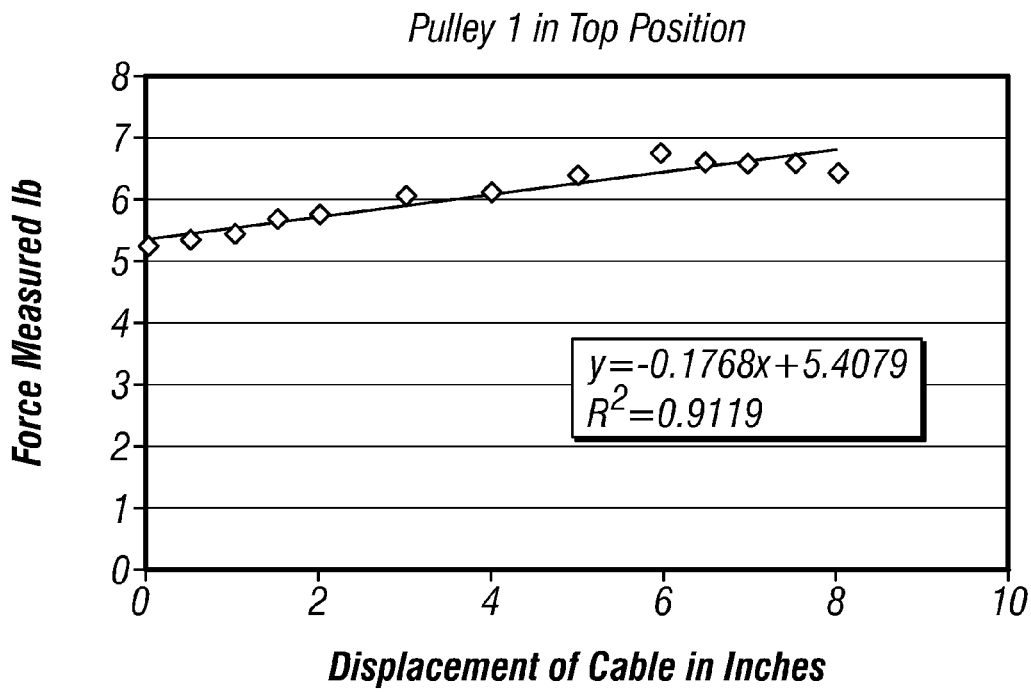
Figure 17B:
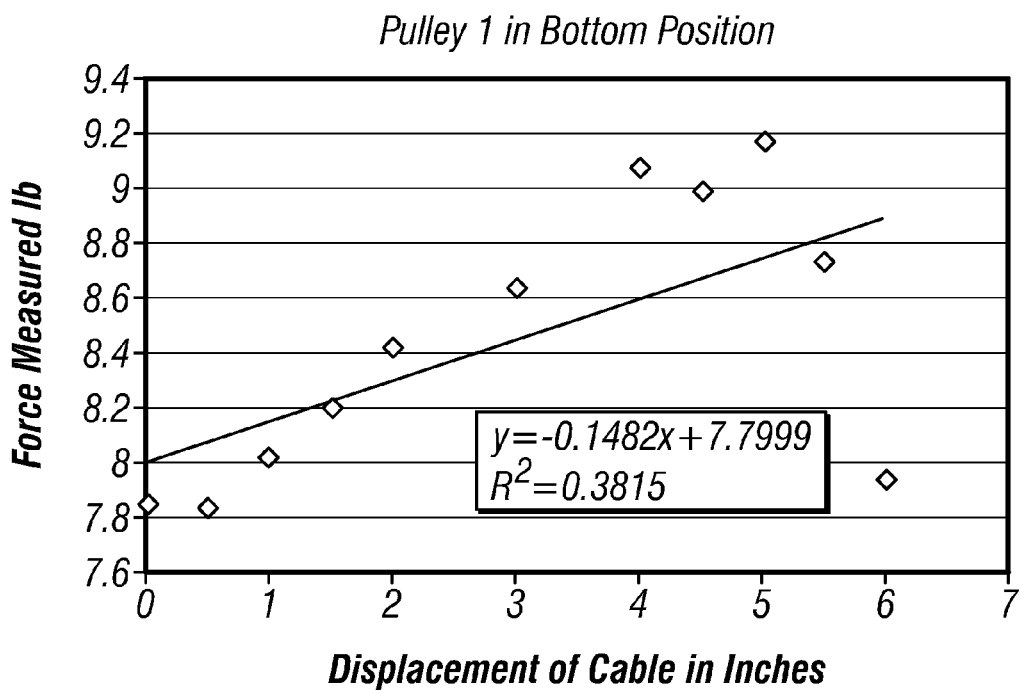
Figure 18:
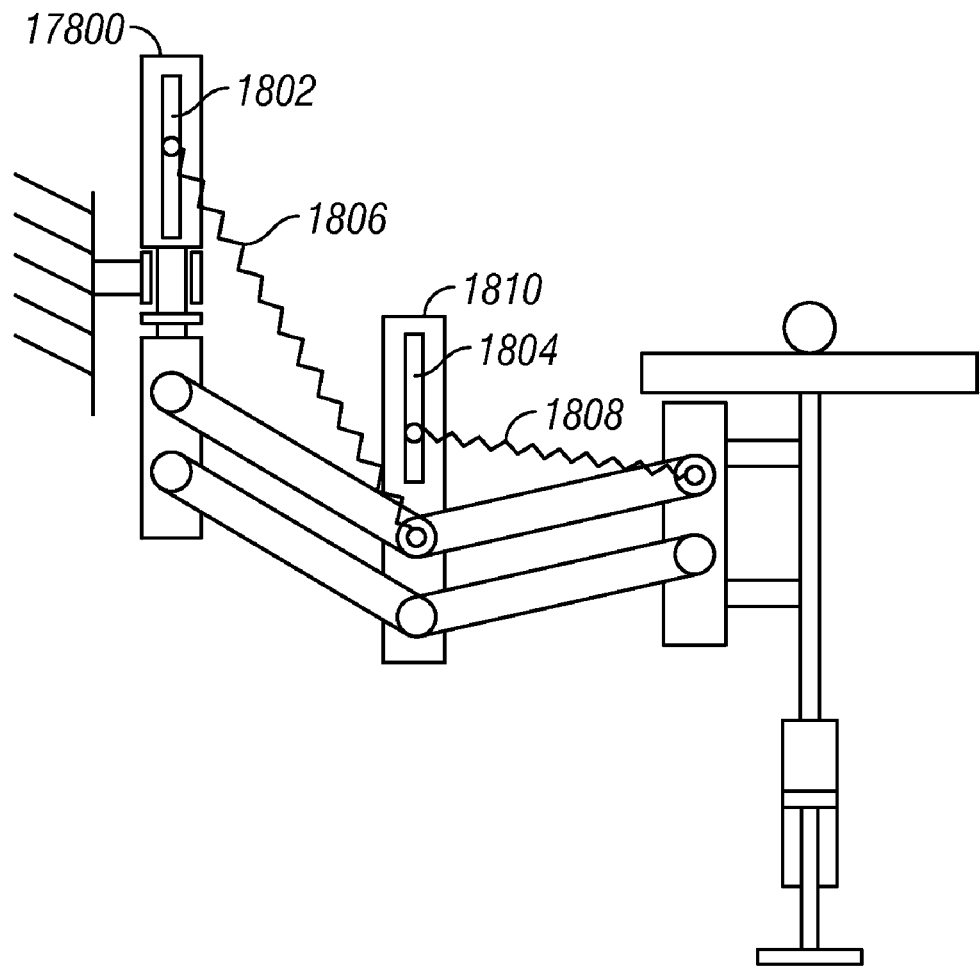

FIG. 5 is a drawing illustrating an embodiment of the present invention comprising a gravity balanced test stand; this figure is for the description of gravity balancing only and thus some parts of the stand such as the ball joint are not presented in the figure FIG. 6 is a drawing illustrating a dynamic simulation model of a test stand; due to mathematical complexity, only some of the major components of the test stand for gravity-balancing are shown in the simulation model FIGS. 7 and 8 are graphs of lifting force versus time requirements for gravity balanced systems and systems with no gravity balancing;

FIG. 9 is a graph of the vertical displacement of a UAV subject to disturbances under three different conditions;

FIGS. 10 and 11 are graphs of the force in the ball joint between a UAV and a test stand;

FIG. 12 is a drawing illustrating an embodiment of the present invention comprising a test stand;

FIGS. 13A and 13B are drawings illustrating a test stand when a UAV is landing or crashing and when a UAV is flying;

FIG. 14 is a drawing which illustrates an embodiment of the present invention which was constructed and tested;

FIGS. 15A-15B, 16A-16B and 17A-17B illustrate graphs of test data from hardware tests performed on springs for a test stand; and FIG. 18 is a drawing illustrating an embodiment of the present invention comprising attachment mechanisms for springs of a test stand.

DETAILED DESCRIPTION OF THE INVENTION

Unmanned air vehicle (UAV) or test vehicle is defined throughout the specification and claims as an aircraft that flies without a human crew on board the aircraft, including but not limited to, remotely piloted vehicles, unmanned aircraft systems, micro air vehicles, and reusable, un-crewed vehicles capable of controlled, sustained, and level flight.

Springs is defined throughout the specification and claims as any elastic device or other system or structure capable of substantially regaining all or a portion of its original shape after being compressed or extended, including but not limited to, a coil of wire.

Substantially vertical is defined throughout the specification and claims as vertical or substantially vertical.

One embodiment of the present invention preferably comprises a test stand for testing unmanned air vehicles, and preferably micro air vehicles, which typically measure no more than about 6 to 10 inches in the longest dimension. The test stand of this embodiment comprises an arm having at least two members, the members preferably forming parallelograms. The arm of the test stand preferably provides three degrees of freedom to the test vehicle. This embodiment also preferably comprises a joint, which provides an additional three degrees of freedom to the test vehicle. The three degrees of freedom provided by the joint are preferably pitch, roll and yaw. The passive test stand of this embodiment employs springs to achieve gravity balancing for each configuration within a workspace. The test stand allows a test vehicle to hover or fly in all 6 degrees of freedom in a large workspace. All of the weight of the entire moving part of the test stand is self balanced, such that no static load is exerted on the tested vehicle, allowing the vehicle to be tested under a condition that is very similar to a free flight test with no stand.

Figure 1:
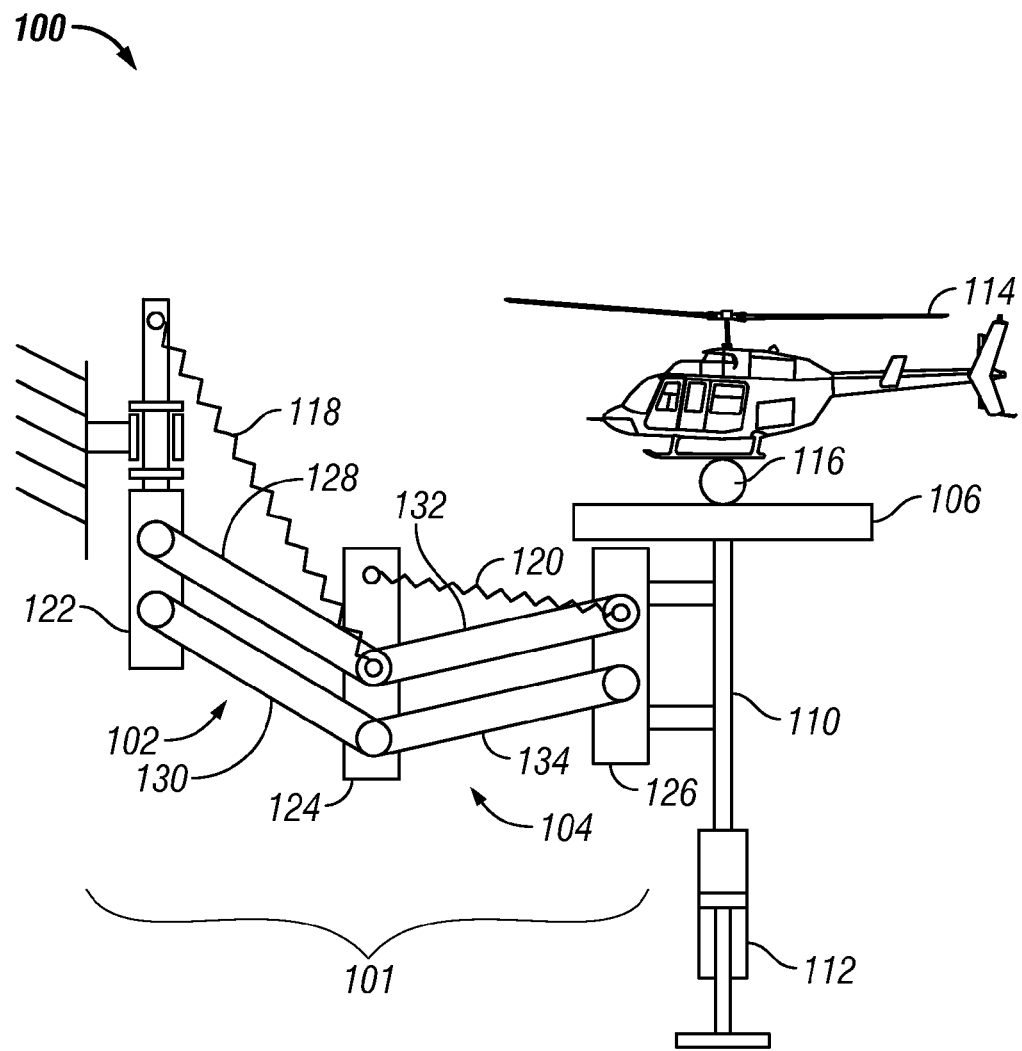
FIG. 1 is a schematic drawing of an embodiment of the present invention comprising a test stand.

As illustrated in FIG. 1, test stand 100 is an embodiment of the present invention. Test stand 100 preferably comprises arm 101, platform 106, and stick 110 with optional damper 112. In this embodiment, test vehicle 114 is preferably disposed on joint 116. Joint 116 is preferably disposed on stick 110 and platform 106 is preferably attached to stick 110. Arm 101 preferably comprises first and second members 102 and 104. Members 102 and 104 are preferably comprised of member portions 122, 124, 126, 128, 130, 132, and 134. Member portions 122, 124, 126, 128, 130, 132, and 134 preferably form two parallelograms and are preferably moveably connected via ball bearings. However, other fasteners can also be used for connecting member portions 122, 124, 126, 128, 130, 132, and 134. For example, pins, bolts, nails, glue, tape, buttons, snaps, hinged pins, slidable pins, screws, threaded pins, bracket screws, pegs, rotatable fasteners, ball and socket fasteners, combinations thereof and the like can be used to moveably connect member portions 122, 124, 126, 128, 130, 132, and 134.

Arm 101 of FIG. 1 is preferably movable. Arm 101 may be movably hinged to a fixed surface on one end and fixedly attached to stick 110 on a second end, opposite of the first end. Arm 101 preferably provides three DOF to test vehicle 114 and can preferably move up and down, out and in, and back and forth. Test stand 100 provides a total of six DOF to test vehicle 114, three DOF of which are provided by movable arm 101 and the other three are provided by joint 116 (pitch, roll, and yaw).

Springs 118 and 120 of FIG. 1 preferably balance the weight of the moving parts of test stand 100 in an embodiment of the present invention. Spring 118 (with stiffness $k_1$) is preferably disposed between member portions 122 and 124 of member 102; while spring 120 (with stiffness $k_2$) is preferably disposed between member portions 124 and 126 of member 104.

Member portions 122, 124, and 126 are preferably substantially vertical. Member portion 124 is preferably located between members 102 and 104 and forms an end of both members 102 and 104. Members 102 and 104 are preferably movably hinged in relation to one another.

In one embodiment of the present invention, test vehicle 114 is secured to joint 116 using an adapter (not shown) that is attached to the bottom of vehicle 114. The adapter is preferably a bracket screw comprising threads on both ends. However, any apparatus known in the art can be used to secure test vehicle 114 onto joint 116.

In another embodiment of the present invention, joint 116 raises and lowers as the test vehicle takes off, flies and lands or crashes. In this embodiment of the present invention, platform 106 and stick 110 are preferably attached via an adapter and form a single unit. Stick 110 is preferably hollow and is preferably slotted to allow member portion 126 to slide up and down stick 110. Member portion 126 is preferably moveably connected to joint 116 via a connector (not shown) inside hollow stick 110. Thus, as joint 116 moves up and down, so does member portion 126 and visa versa. When stick 110 or optional damper 112 touches a surface, platform 106 preferably raises toward test vehicle 114. When platform 106 is in a raised position, test vehicle 114 assumes an upright position eliminating the three degrees of freedom provided by joint 116. When test vehicle 114 begins to lift up on takeoff, joint 116 raises, thereby raising member portion 126. As a result, platform 106 and stick 110 slide down away from test vehicle 114. While in test flight, test vehicle 114 is provided with three degrees of freedom by joint 116.

Figure 2:
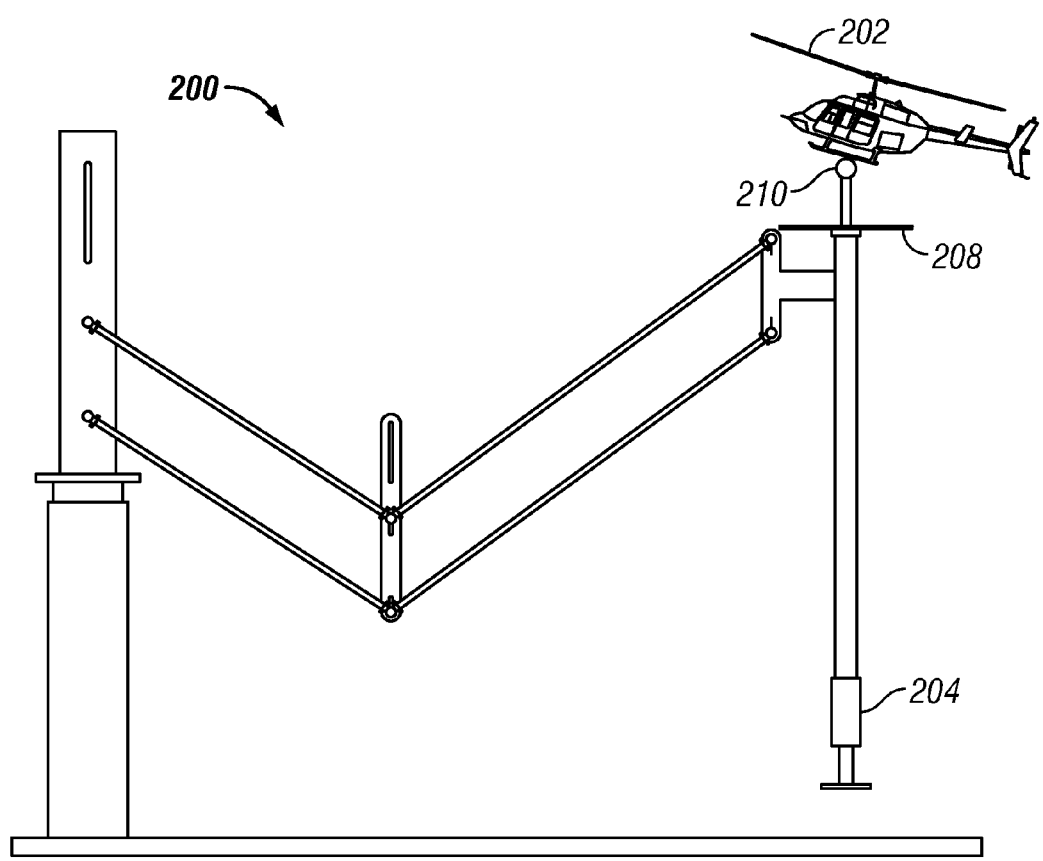
FIG. 2 is a drawing which illustrates an embodiment of a test stand of the present invention.
Figure 3A:
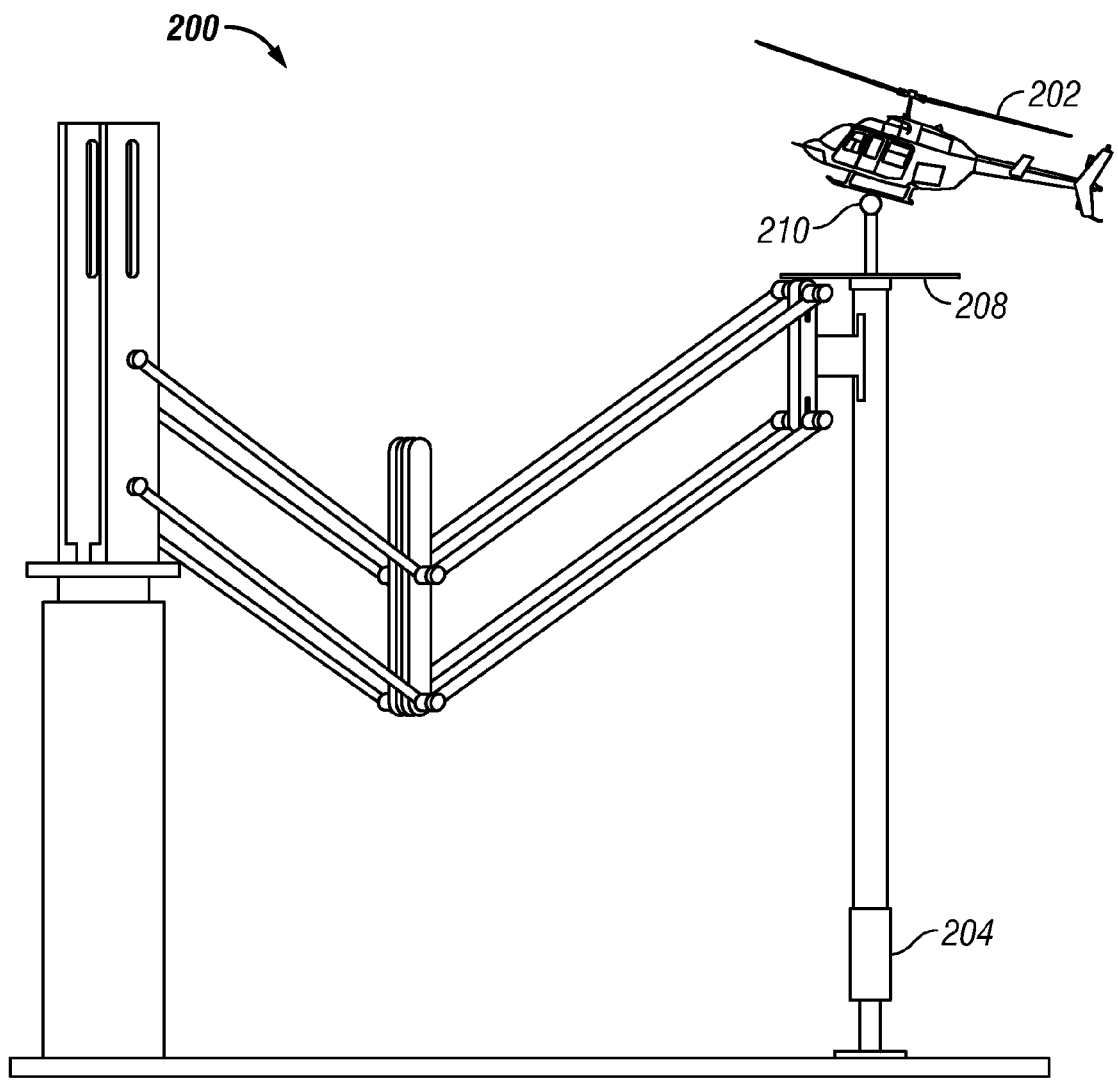
FIG. 3A is a schematic drawing of an embodiment of the present invention comprising a test stand wherein a damper is touching the ground, thereby preventing a tested vehicle from landing or "crashing"
Figure 3B:
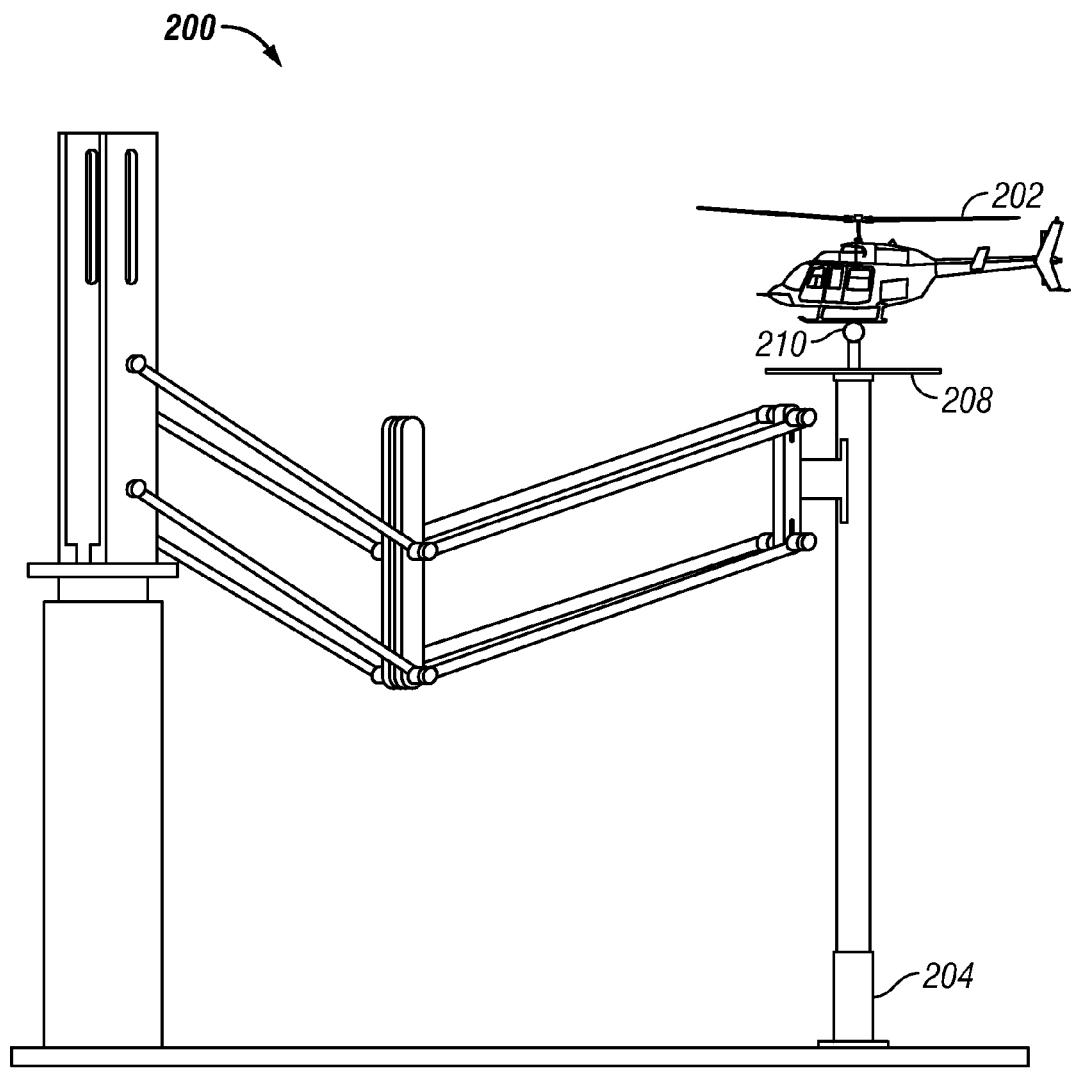
FIG. 3B is a drawing which illustrates an embodiment of the present invention comprising a test stand with the vehicle in its normal orientation.
Figure 3C:
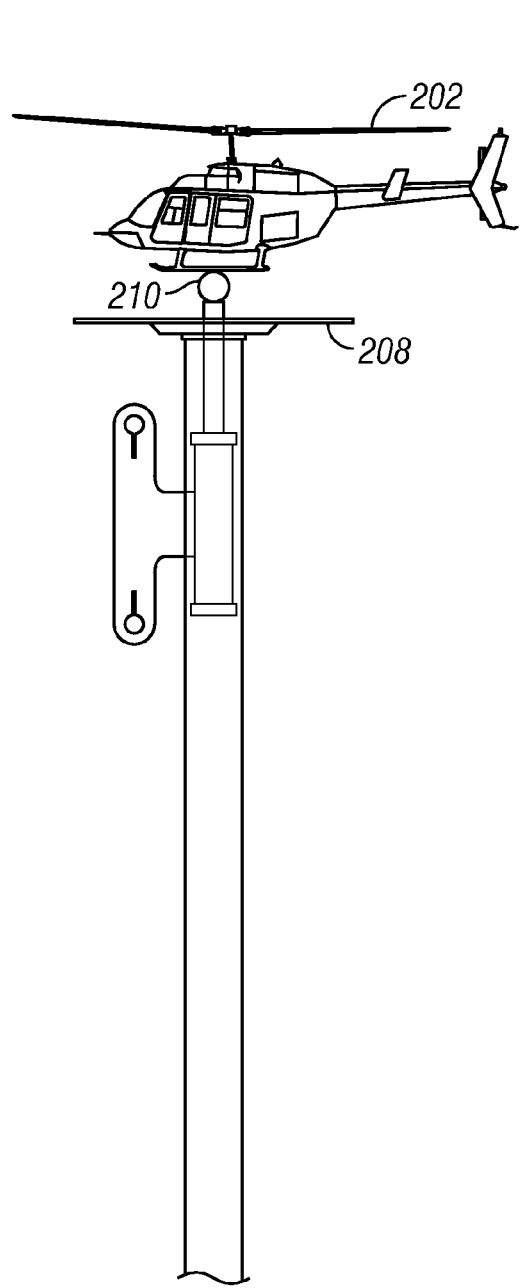
FIGS. 3C and 3D are drawings which illustrate an embodiment of the present invention comprising a test stand having a platform in a raised position and a test stand having a platform in a lowered position.
Figure 3D:
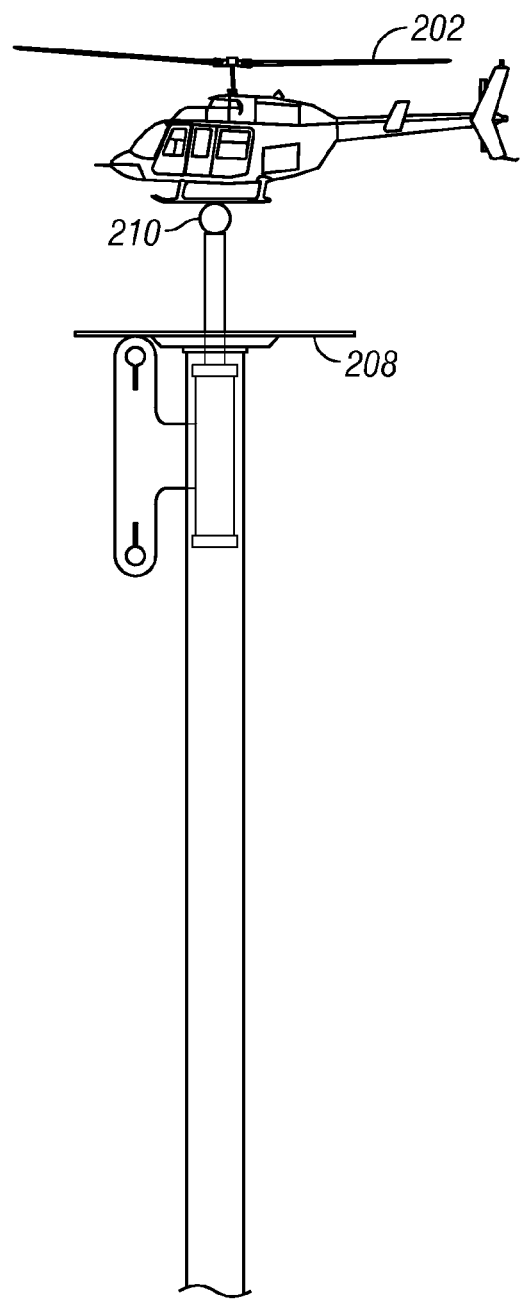

As illustrated in FIGS. 2, 3A, and 3B, an embodiment of the present invention comprises test stand 200 in flight and after landing. FIG. 2 illustrates test stand 200 when vehicle 202 is in flight, and joint 210 is in a raised up position. If test vehicle 202 has a tendency to crash for some reason, damper 204 touches the ground first and absorbs most of the impact energy, as illustrated in FIG. 3A. Because of the contact force of damper 204 touching the ground, platform 208 is raised thus bringing platform 208 in close contact with joint 210, and eliminating all the three rotational DOF provided by the ball joint, as illustrated in FIG. 3C. As a result, test vehicle 202 remains upright on platform 208, as shown in FIG. 3B. As illustrated in FIG. 3D, platform 208 lowers as test vehicle 202 resumes flight testing.

Figure 4A:
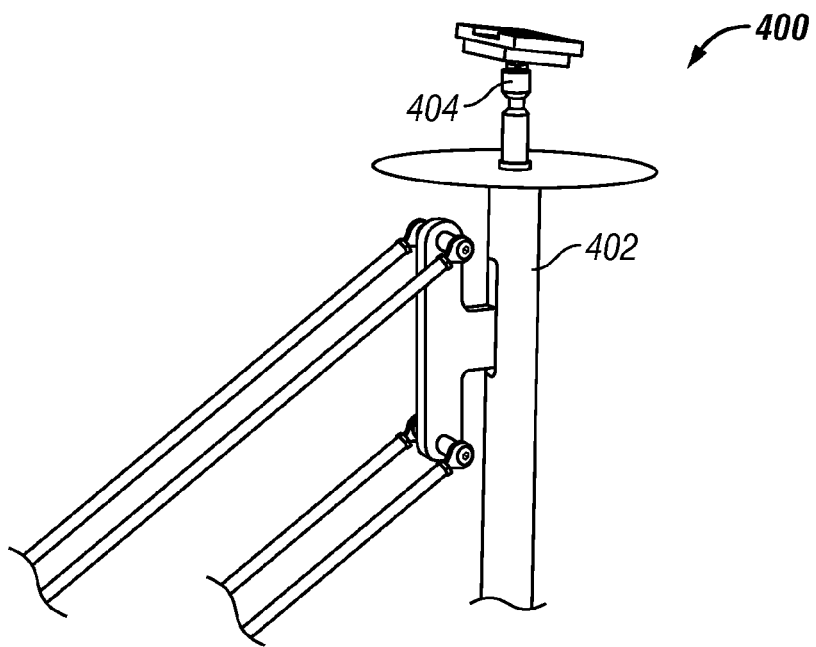
FIGS. 4A and 4B are drawings illustrating configurations of a platform with a joint is a raised and lowered position.
Figure 4B:
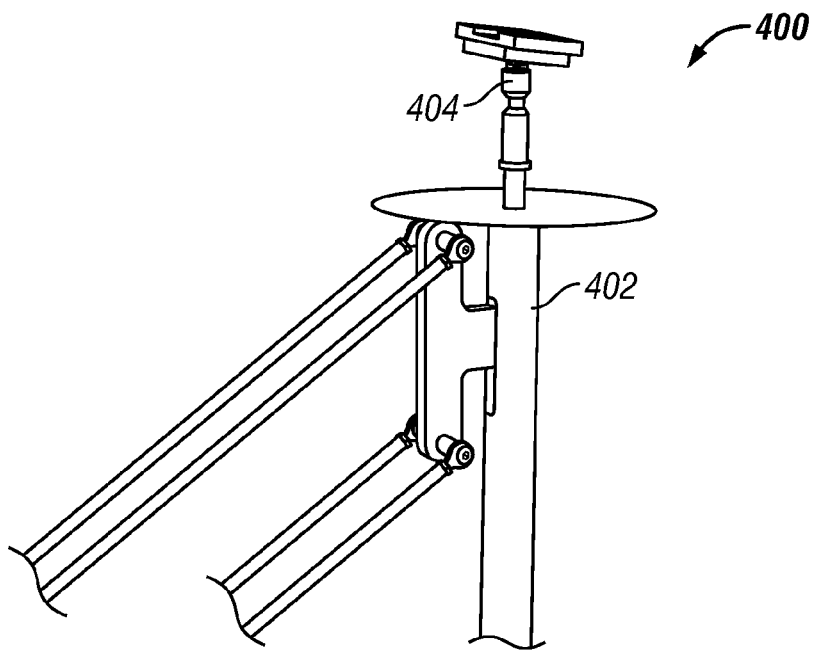

Referring to FIG. 4A, member portion 402 and joint 404 are in lowered positions, thereby eliminating the degrees of freedom provided by joint 404. Referring to FIG. 4B, member portion 402 and joint 404 are raised, thereby providing three degrees of freedom for a test vehicle.

One embodiment of the present invention preferably employs springs to achieve static gravity balancing within a workspace. The gravity balancing is preferably achieved in any arbitrary configuration. When gravity balancing with springs, the total potential energy, including both the gravitational and elastic potential energy, preferably remains constant for any working configuration, namely, $$\frac{\partial V}{\partial \theta} = 0 \Rightarrow V(\theta) = \text{constant} \quad (1)$$

where V is the potential energy of the system and θ is the set of generalized coordinates describing the arm configuration.

A schematic illustration of a static gravity balancing apparatus is shown in FIG. 5. As indicated in FIG. 5, test stand 500 preferably comprises two members, 502 and 504 and mounting platform 506. The angular displacements of members 502 and 504 are denoted by $\theta_1$ and $\theta_2$, which are measured from the vertical Z axis to the center lines of the corresponding links.

The potential energy of test stand 500 due to gravity can be expressed as:

$$V_{plgm1} = 2(h_1 + r_1 \cos\theta_1) m_1 g + h_2 m_1 g + (h_1 + l_1 \cos\theta_1 + r_{12}) m_{12} g \quad (1a)$$

$$V_{plgm2} = 2(h_1 + l_1 \cos\theta_1 + r_2 \cos\theta_2) m_2 g + h_2 m_2 g + (h_1 + l_1 \cos\theta_1 + l_2 \cos\theta_2 + r_3) m_3 g \quad (1b)$$

Where $m_1$, $l_1$, $r_1$=mass, length and mass center position, respectively, of each portion in first member 502, $m_2$, $l_2$, $r_2$=mass, length and mass center position, respectively, of each portion in second member 504, $m_{1,2}$=mass of portion 508 between members 502 and 504, and $m_3$=total mass of mounting platform 506, stick 510, and safety damper 516.

The potential energy of test stand 500 due to springs 512 and 514 is preferably calculated as:

$$V_{s1} = \frac{1}{2} k_1 (d_1^2 + l_1^2 - 2 d_1 l_1 \cos\theta_1) \quad (2a)$$

$$V_{s2} = \frac{1}{2} k_2 (d_2^2 + l_2^2 - 2 d_2 l_2 \cos\theta_2) \quad (2b)$$

where $d_1$, $d_2$=the attachment position of springs 512 and 514, $k_1$, $k_2$=the stiffness coefficients of springs 512 and 514, and α=the mass ratio between test stand 500 and test vehicle 506.

The total potential energy of test stand 500 is the sum of the gravitational and elastic potential energies, which is:

$$V = V_{plgm1} + V_{plgm2} + V_{s1} + V_{s2} = C_0 + \sum_{i=1}^{7} C_i \cos\theta_i \quad (3)$$

where $$C_0 = (2h_1 + h_2)(m_1 + m_2)g + \\ (h_1 + r_{12}) m_{12} g + (h_1 + r_3) m_3 g + \frac{1}{2} \sum_{i=1}^{2} k_i (d_i^2 + l_i^2) \quad (4a)$$

$$C_1 = 2 r_1 m_1 g + l_1 (2 m_2 g + m_{12} g + m_3 g - k_1 d_1) \quad (4b)$$

$$C_2 = 2 r_2 m_2 g + l_2 (m_3 g - k_1 d_1) \quad (4c)$$

From Eq. (3), the total potential energy is constant if the second term vanishes. Therefore, the condition for the gravity balancing of this test stand is found to be $$C_i = 0, i = 1, 2 \quad (5)$$

which requires a set of spring stiffness as follows $$k_1 = \frac{2 m_1 r_1 + l_1 (2 m_2 + m_{12} + m_3)}{l_1 d_1} g \quad (6)$$

$$k_2 = \frac{2 m_2 r_2 + l_2 m_3}{l_2 d_2} g$$

In other words, such a set of springs keeps the total potential energy of the test stand constant in any working configuration. Hence, the test stand is gravity balanced. It should be emphasized that springs 512 and 514 in FIG. 5 do not have to be installed exactly as shown in the FIG. 5 or in other similar figures. Springs 512 and 514 can be installed in other places on test stand 500 through the use of cables and pulleys. The stretches of the two springs are preferably the same lengths as those of springs 512 and 514 shown in FIG. 5. One such an example is shown in FIG. 14.

A set of springs defined by Eq. (6) can balance a particular device, because the determined springs' stiffness values depend on the parameters of the stand. However, when these parameters are changed for some reason, for example, because of the manufacturing inaccuracy (within the tolerances), it is inconvenient to change the springs in practice. A solution to this problem is to use the same set of springs but to preferably leave the springs' attachment location adjustable, namely, to change the value of $d_1$ and $d_2$ instead. This can be accomplished using an adjustment mechanism, as shown in FIGS. 14 and 18.

Referring to FIG. 18, in one embodiment of the present invention, adjustment mechanisms 1800 and 1810 comprise sliding apparatuses 1802 and 1804 wherein springs 1806 and 1808 slide up or down in sliding apparatus 1802 and 1804. Moving springs 1806 and 1808 up sliding apparatuses 1802 and 1804 increases the values of $d_1$ and $d_2$ increasing the spring stiffness. Moving springs 1806 and 1808 down sliding apparatuses 1802 and 1804 produces the opposite effect. Adjustment mechanisms 1800 and 1810 are not required to be sliding mechanisms, but can alternatively comprise a plurality of pegs, buttons, snaps, nails, screws, bolts, a combination thereof or the like, located along the springs' attachment location for adjusting springs 1806 and 1808. The adjustment is based on the calculations given in Eq. (7).

$$d_1 = \frac{2m_1 r_1 + l_1(2m_2 + m_{12} + m_3)}{l_1 d_1} g \quad (7)$$

$$d_2 = \frac{2m_2 r_2 + l_2 m_3}{l_2 d_2} g$$

INDUSTRIAL APPLICABILITY

The invention is further illustrated by the following non-limiting examples.

Example 1

By applying the equations discussed above, one embodiment of a gravity balanced test stand was built. The following parameters of this embodiment were specified with respect to the working space requirements, i.e.

$m_1 = m_2 = 2.5$ kg; $m_3 = 2$ kg; $m_{12} = 1.5$ kg $l_1 = l_2 = 0.5$ m; $r_1 = r_2 = 0.25$ m;

$d_1 = d_2 = 0.2$ m; $g = 9.81$ m/s$^2$ (8)

Substituting these parameters into Eq. (6) leads to $k_1 = 539.55$ N/m; $k_2 = 171.68$ N/m (9)

With these spring stiffness values and the system parameters from the design, the gravity force of the system is balanced.

To compare the stand with and without gravity balancing, a dynamic simulation model of a test stand was created and is illustrated in FIG. 6. In this example, the parameters of stand 600 in this model are the same as those given above. The mass of UAV 602, which is a small helicopter in this example, is approximately $m_H = 3$ kg.

In this example, a concentrated lifting force was applied to UAV 602 at its center of mass (CM), such that UAV 602 hovered at initial positions. As a result, the entire system, including test stand 600 and UAV 602, was in equilibrium. UAV 602 was assumed to have several different initial positions. The components of this required force for a flying UAV were measured and are illustrated in FIG. 7 and FIG. 8.

As shown in FIG. 7 and FIG. 8, the required lifting force for a gravity balanced system is preferably equal to the weight of a UAV and the axial force is preferably zero, regardless of the UAV position. However, for a system without gravity balancing, both the lifting force and the axial force highly depend on the total mass of the whole system and the initial position. The results indicate that a system with no gravity balancing places more effect on the UAV, which is undesirable during testing.

Example 2

In a second example, a sinusoidal disturbance was added to the lifting force along the Z direction (the vertical direction). The resulting external force is expressed as $$F_L = F_Z + 0.05 m_H g \sin(10t) \quad (10a)$$

$$F_A = F_X \quad (10b)$$

where $F_Z$ and $F_X$ are the required lifting and axial forces. As a reference, the behavior of a UAV without the stand was also simulated. FIG. 9 is a graph which illustrates the vertical displacement of a UAV subject to disturbance under these three conditions.

As illustrated in FIG. 9, due to the sinusoidal disturbance, the UAV no longer hovers at the initial position. Instead, a stand without gravity balancing constrains the motion of a UAV and leads to an oscillation around the initial position. The gravity balanced stand allows the UAV to drift up continuously, which is closer to the real behavior of a free flying UAV. Because of the dynamic loading (i.e. the inertia force) applied to the UAV by the stand, the UAV with a gravity balanced stand drifts less than the free flying one. However, when a, the mass ratio between the stand and the UAV, decreases from about 4.5 to about 2.5, the UAV tends to drift more freely. Thus, fabricating a test stand with lighter materials results in a more realistic test condition.

Example 3

The force in a joint between a UAV and a stand was also measured to illustrate the effect on the UAV that is added by the stand, as illustrated in FIGS. 10 and 11.

Both the vertical (Z) and the horizontal (X) joint force of the gravity balanced system remains close to zero, except for a slight vibration due to the added periodical disturbance. However, the forces of the non-gravity balanced system are not close to zero and vary with the initial position. The results seen in FIGS. 10 and 11 show that a test stand with gravity balancing places much less burden on a tested vehicle, which allows the vehicle to be tested under a condition much closer to reality.

The gravity balancing technology as described in the embodiments of the present invention results in a test stand that compensates its own weight for all working configurations. Thus, the gravity force of the stand does not add any load to the vehicle being tested with the stand. Gravity balancing is preferably accomplished by selecting stiffness values or attachment locations of springs disposed on a test stand. Since the weight of the stand, after being balanced, does not put any burden on the tested UAV, the UAV can fly in a condition much closer to a free flying condition. This is especially desirable for micro UAVs or MAVs because an MAV has very little lifting power or payload capacity other than flying itself. In embodiments of the present invention, protection of the tested vehicle from suddenly making contact with the stand or ground was accomplished using a gravity balanced test stand. Self collision of the vehicle was also avoided.

Another embodiment of the present invention is illustrated in FIG. 12. In this embodiment, test stand 1200 is preferably a passive parallel mechanism comprising arm 1202, platform 1204, and stick 1206. Arm 1202 preferably comprises two articulated member linkages 1226 and 1228, one end of which is hinged to base 1216 and the other end is connected to stick 1206. Joint 1210 is preferably moveably connected to member portion 1222 via a connector (not shown) inside stick 1206, which is preferably hollow.

In one embodiment of the present invention, test vehicle 1208 is positioned on joint 1210. Joint 1210 is preferably a ball joint. Damper 1212 is preferably attached to the lower end of stick 1206. The test stand of this embodiment allows for a total of six degrees of freedom (DOFs), three for the translational motion provided by arm 1202 and the other three for rotation provided by joint 1210. There are preferably two springs that compensate for the weight of moving arm 1202. First spring 1214 is preferably installed between member portions 1217 and 1218 of member linkage 1226 (the inner section of arm 1202); while second spring 1220 is preferably between member portions 1218 and 1222 of member linkage 1228 (the outer section of arm 1202). In this embodiment, both springs 1214 and 1220 are attached to member portion 1218. Member portion 1218 is located between portions 1216 and 1222 and forms an end of both member linkage 1226 and member linkage 1228. Both springs 1214 and 1220 are preferably linear springs.

Because arm 1202 preferably comprises member linkages 1226 and 1228, it keeps stick 1206 at one end of stand 1200 in a substantially vertical position. Platform 1204 is pushed against the landing gear of UAV 1208 in a non-flight case to keep test UAV 1208 in an upright orientation when stick 1206 is contacting a surface, as illustrated in FIG. 13A. When test UAV 1208 is in flight, ball joint 1210 raises up to allow larger angular maneuvering of UAV 1208 and stick 1206 is lifted off a surface, as illustrated in FIG. 13B. If UAV 1208 has a tendency to crash for some reason, damper 1212 at the bottom of stick 1206 preferably touches the ground first and absorbs most of the impact energy. At the same time, mounting platform 1204 preferably raises against the landing gear of UAV 1208. As a result, UAV 1208 is forced to return to and maintain its normal (upright) orientation, as illustrated in FIG. 13A.

Example 4

Based on the equations above, a second example test stand was built. The overall dimension of this test stand was designed for a typical size of a MAV to hover and maneuver in a reasonable flight space. After the arm of the stand was built, the following parameters were directly measured from the test stand arm:

$m_1=0.1525$ kg, $m_2=0.215$ kg $m_3=0.29$ kg; $m_{12}=0.1575$ kg $l_1=0.4572$ m (18 in), $l_2=0.6096$ m (24 in)

$A=0.1954$ m $r_1=l_1/2$, $r_2=l_2/2$ $d_1=0.2794$ m (11 in), $d_2=0.127$ m (5 in)

$$g=9.81 \text{ m/s}^2 \qquad (11)$$

Substituting these parameters into (6) leads to $k_1=46.43$ N/m (0.265 lb/in)

$$k_2=121.70 \text{ N/m (0.695 lb/in)} \qquad (12)$$

With these stiffness values and the system parameters from the design, the gravity force of the moving arm was completely balanced.

The example test stand is illustrated in FIG. 14. Note that the springs can be located at any location on test stand through the use of cables and pulleys. In FIG. 14, two springs are located at one end of the test stand. In order to select the appropriate springs and mounting locations, the mass and center of mass of each of the hardware pieces were known. Although the masses of the components were estimated using computer aided design (CAD) models from the design, true values could be different than the estimated values due to errors in material properties, manufacturing, assembly, etc. Thus, the computed stiffness values were adjusted to match the assembled hardware. This was done by a series of hardware tests right after the arm of the prototype was built. The hardware test was also performed to confirm the assumption in the design that the springs were linear springs. In the hardware test, the arm was moved to different configurations and held in equilibrium by the cables (without the springs). The displacements and tensions of the cables at each configuration were measured. Some of the test data were plotted in FIGS. 15A-15B and 16A-16B. The test data indicated that the springs were linear springs and their stiffness values were easily extracted by curve fitting with the plotted test data (i.e., the slopes of the fitted lines).

Although the required stiffness values of the springs were calculated in theory first and refined by the hardware test later, such springs could not be easily found from the commercial off the shelf (COTS) products in the market unless custom-built springs were ordered. Ordering customer-built springs is expensive. Instead, the springs were adjusted at the attachment locations, as described in equations (7), to solve the problem. This was done by making the two attachment locations of each spring adjustable for fine tuning of the mechanism.

The hardware test also revealed that, when the inner arm (the inner section of the arm) moves down beyond a certain range, the linearity between the displacement and tension of the cable no longer hold true, as illustrated in FIGS. 17A and 17B. This is because the cable mechanism is close to its singular configuration (when $\theta_1=180°$ and thus, the linear force/displacement relation becomes unstable. This explanation can be easily verified by kinematics analysis of the mechanism at the configuration of $\theta_1=180°$, where an infinitely large tension is required to pull the cable in order for the arm to go out of the configuration. As a result, when the arm is close to the singular configuration, the Jacobian matrix of the test stand becomes very ill-conditioned (unstable situation). Mechanical stops are preferably installed near some of the joints to keep the arm from going close to the singular configuration.

Before the springs were installed, they were tested and the springs were adjusted accordingly. A stiffness value of the springs at small deflections caused an initial force at near zero displacement. This property was both helpful and inconvenient. It was helpful in the case of the inner spring since the spring did not need as much pre-stretch to balance in the working range because this section is at an obtuse angle. It is different for the inner arm however, since its range of motion is in an acute angle where the zero initial spring length is necessary. The acute angle leaves the spring unstretched before this section of the arm can reach a vertical position and further reduces the workspace of the test stand.

The example test stand was easily moved from one configuration to another by a tiny force. The platform was pushed or pulled by a force of only 0.6 N in the radial direction (the horizontal direction of folding or unfolding the arm). For a vertically up or down movement, only about 0.4 N of force was required and for a swing motion about the fixed vertical axis, less than about 0.1 N of force was sufficient. These required forces are just average values. In fact, these forces varied from configuration to configuration. They were much smaller than the weight of the moving arm, which was about 1.2 kg (nearly 11.8 N). These small required forces were mainly because of the joint friction torques.

A number of micro UAVs were tested with the example test stand. All of them flew well within the workspace of the test stand. Some of the tested UAVs could barely fly by The preceding examples can be repeated with similar success by substituting the generically or specifically described components and/or operating conditions of this invention for those used in the preceding examples.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A gravity balanced stand for testing an unmanned air vehicle (UAV) comprising:
   an arm comprising at least two members, said members providing at least three degrees of freedom to the UAV;
   a joint disposed on said arm, said joint providing at least three degrees of freedom to the UAV; and
   at least one spring attached to said arm, wherein said spring achieves gravity balancing.

2. The stand of claim 1 further comprising a stick disposed on an outer end of said arm, wherein said joint is disposed on said stick of said arm.

3. The stand of claim 2 further comprising a platform disposed between said stick and said joint.

4. The stand of claim 2 further comprising a damper disposed on a bottom portion of said stick for reducing impact on the UAV during landing.

5. The stand of claim 2 wherein said stick comprises a substantially vertical stick.

6. The stand of claim 1 wherein said spring comprises a linear spring.

7. The stand of claim 1 further comprising an adjustment mechanism for adjusting an attachment location of said spring.

8. The stand of claim 7 wherein said adjustment mechanism comprises a sliding apparatus.

9. The stand of claim 1 wherein said members comprise parallelograms.

10. The stand of claim 1 wherein said joint comprises a ball joint.

11. The stand of claim 1 wherein said members provide three translational degrees of freedom to the tested vehicle.

12. The stand of claim 1 wherein said joint provides three rotational degrees of freedom to the vehicle under test.

13. The stand of claim 1 wherein said spring comprises a balancing spring.

14. The stand of claim 1 wherein each of said members comprises four member portions, each portion forming a side of said member.

15. The stand of claim 14 wherein two of said member portions comprise substantially vertical member portions.

16. The stand of claim 15 wherein said spring is disposed between said substantially vertical member portions.

17. The stand of claim 15 wherein one of said substantially vertical member portions is located between and forms an end of both said members.

18. The stand of claim 17 wherein one of said substantially vertical member portions further comprises a connector for connecting to said joint.

19. The stand of claim 14 further comprising ball bearings for connecting said member portions.

20. The stand of claim 1 further comprising a second spring attached to said arm.

21. A method for testing an unmanned aerial vehicle (UAV) comprising:
   providing a stand comprising an arm having at least two members, the arm providing at least three degrees of freedom to the UAV;
   disposing a joint on the arm of the stand, the joint providing at least three degrees of freedom to the UAV;
   attaching the UAV to the joint;
   gravity balancing the stand via at least one spring; and
   testing the UAV.

22. The method of claim 21 further comprising reducing impact on the UAV during landing by providing a dampener.

23. The method of claim 21 further comprising flying the UAV.

24. The method of claim 21 landing the UAV.

* * * * *